US005208413A

United States Patent [19]

Tsumura et al.

[11] Patent Number: 5,208,413

[45] Date of Patent: May 4, 1993

[54] VOCAL DISPLAY DEVICE

[75] Inventors: Mihoji Tsumura; Shinnosuke Taniguchi, both of Osaka, Japan

[73] Assignee: Ricos Co., Ltd., Japan

[21] Appl. No.: 803,155

[22] Filed: Dec. 5, 1991

[30] Foreign Application Priority Data

Jan. 16, 1991 [JP] Japan .................................... 3-16983
Jan. 16, 1991 [JP] Japan .................................... 3-16984
Jan. 16, 1991 [JP] Japan .................................... 3-16985
Jan. 16, 1991 [JP] Japan .................................... 3-16986
Jan. 16, 1991 [JP] Japan .................................... 3-16987

[51] Int. Cl.[5] ........................ G11B 20/02; G10G 7/02

[52] U.S. Cl. ........................................ 84/615; 84/462; 84/610

[58] Field of Search ................. 84/601, 602, 615, 647, 84/653, 454, 609, 610, 625, 634, 477 R, 463

[56] References Cited

U.S. PATENT DOCUMENTS 4,120,229 10/1978 Ota ........................................ 84/454
5,046,004 9/1991 Tsumura et al. .................... 364/419

FOREIGN PATENT DOCUMENTS 1-184685 7/1989 Japan .
2-62760 3/1990 Japan .
2-153665 6/1990 Japan .
2-183660 7/1990 Japan .
2-192259 7/1990 Japan .

*Primary Examiner*—William M. Shoop, Jr.
*Assistant Examiner*—Helen Kim
*Attorney, Agent, or Firm*—Thompson, Hine and Flory

[57] ABSTRACT

Conventional karaoke devices simply show lyrics on screen. This invention displays not only lyrics but also data useful for the enhancement of the singer's presentation such as the strength of the vocals and the pitch. More precisely, vocal data, which indicates the special requisites of a specific vocal rendition such as its strength and pitch, and the current lyric position indicator, which marks the current position in the lyrics, are correlated with the music data to which they correspond and then stored in memory. The said vocal data and current lyric position data are then read out of memory and each block of vocal data is displayed on the screen of a visual display medium a little in advance of the music to which it corresponds while the current lyric position within said block of vocal data is indicated in time with the music. Moreover, the strength and basic frequency of an actual vocal rendition can be detected and compared with the stored vocal data.

9 Claims, 9 Drawing Sheets

VOCAL DISPLAY DEVICE

BACKGROUND OF THE INVENTION

1. Field of the Invention

This invention relates to a device for the display of vocal features such as strength and pitch during the reproduction of music for vocal accompaniment.

2. Description of the Prior Art

The conventional type of karaoke device is normally understood to involve the reproduction of karaoke music using some kind of music reproduction device while at the same time displaying the appropriate lyrics in time with the music on a visual display medium. The applicant has made a number of other patent applications in connection with this type of technology (for example, Japanese Patent Application S63-308503, Japanese Patent Application H1-3086, Japanese Patent Application H1-11298).

Although this sort of device makes it quite easy for a user to check the lyrics of a song as he is singing along, there are nevertheless other items of data which a singer also needs in order to improve his general rendition of a song.

SUMMARY OF THE INVENTION

It is an object of this invention to provide a vocal display device on which to display features of vocal presentation such as strength and pitch and which could easily be fitted to a karaoke device of the sort outlined above. In order to achieve the above object, this invention has been designed in such a way as to enable vocal data, which indicates the special features of a specific vocal rendition such as its strength and pitch, and the current lyric position indicator, which marks the current position in the lyrics, to be correlated with the music data to which it corresponds and then stored in memory. The invention also enables said vocal data and said current lyric position data to be read out of memory and each block of vocal data to be displayed on the screen of a visual display medium somewhat in advance of the music to which it corresponds and the current lyric position within said block of vocal data to be indicated in time with the music. The user is able in this way to ascertain details of the features of each vocal block such as its strength and pitch before the corresponding music is reproduced.

The invention also enables the detection of the strength and basic frequency of an actual vocal presentation which can then be compared with the vocal data and the results of the comparison displayed on the visual display medium. The user is in this way able to gauge the perfection of his own vocal rendition in terms of, for example, its strength and pitch. Appropriate indications are also output in accordance with the results of the comparison made between the vocal data and the strength and basic frequency of the actual rendition. The user is thus able to obtain an impartial and at the same time simple evaluation of the precision of his own vocal rendition in terms of features such as its strength and pitch.

BRIEF DESCRIPTION OF THE DRAWINGS

FIG. 1 is a block diagram illustrating the basic configuration of the invention, FIG. 2 is a block diagram illustrating the configuration of the invention in more detail, FIG. 3 provides a conceptual illustration of the configuration of the music data and FIG. 4 illustrates the sort of screen display which would be presented on the visual display medium.

FIG. 6 is a block diagram illustrating the basic configuration of the invention, FIG. 7 is a block diagram illustrating the configuration of the invention in more detail and FIG. 8 illustrates the sort of screen display which would be presented on the visual display medium.

FIG. 9 is a block diagram illustrating the basic configuration of the invention, FIG. 10 is a block diagram illustrating the configuration of the invention in more detail and FIG. 11 is a block diagram illustrating the configuration of the frequency analyzer.

FIG. 12 is a block diagram illustrating the basic configuration of the invention and FIG. 13 is a block diagram illustrating the configuration of the invention in more detail.

FIG. 14 is a block diagram illustrating the basic configuration of the invention and FIG. 15 is a block diagram illustrating the configuration of the invention in more detail.

DETAILED DESCRIPTION OF THE PREFERRED EMBODIMENT

Figure 1:
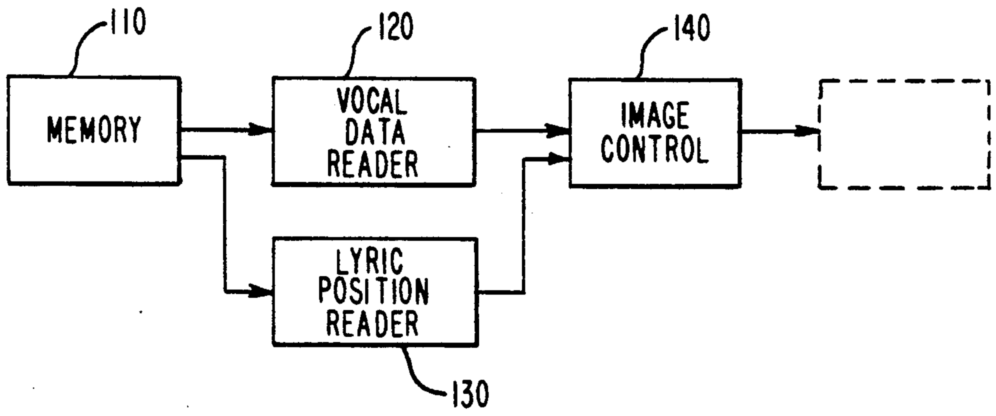
FIG. 1 to FIG. 4 illustrate the first preferred embodiment of the invention where
Figure 2:
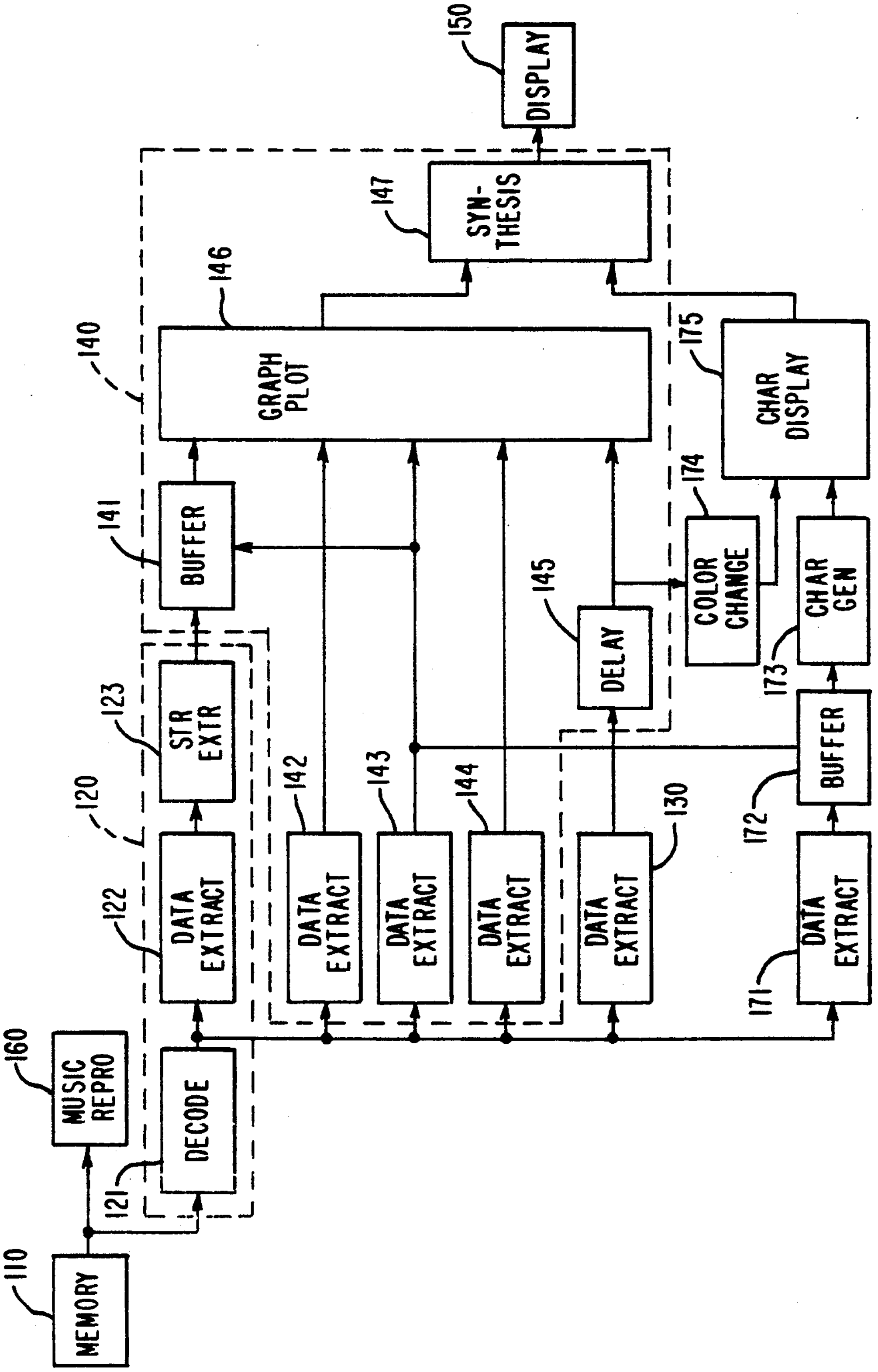
Figure 3:
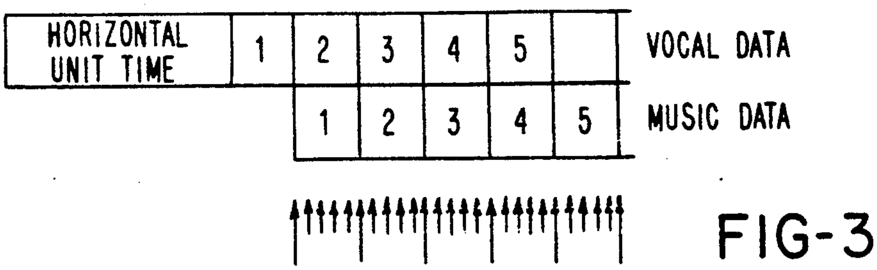

There follows a description of the first preferred embodiment of the invention by reference to FIG. 1 to FIG. 4. FIG. 1 illustrates the basic configuration of the invention while FIG. 2 shows the same thing but in more detail. In FIG. 2 110 is a memory means in which music data for a large number of different pieces of music is stored. Each item of music data also contains vocal data relating to the vocal features of the music. As shown in FIG. 3, the data is divided in conceptual terms into a number of blocks 1, 2, 3—in the ratio of one block to one bar and the blocks are arranged in order in accordance with the forward development of the tune. The vocal data blocks are each almost exactly one block in advance of their corresponding music data blocks. Said vocal data also incorporates strength data which is used to indicate the appropriate strength of the vocal presentation.

A screen display indicator is inserted at the end of each block as shown by the long arrows in FIG. 3 to indicate that the screen display should be updated at these points. Current lyric display position indicators are similarly inserted as required at the points marked by the short arrows in FIG. 3 to show that these are the appropriate points at which to indicate the lyric display position. In practice, of course, each screen display indicator is, in fact, set at a specific time interval t in advance of the boundary of each block of music data. As a result each current lyric position indicator is also set at the same specific time interval t in advance of its real position. The horizontal unit time is written in at the head of the vocal data. This indicates the maximum number of current lyric position indicators permissible per block. Clear screen data is written in at the end of the vocal data to clear the screen at the end of the piece of music. The memory means 110 is also used to store character data relating to the display of the lyrics in character form. Said memory means 110 is also connected to a reproduction device 160 such that music data can be read from the memory means 110 and subsequently reproduced on said reproduction device.

The memory means 110 is also connected to a decoder 121 which is in turn connected in sequence to a vocal data extractor 122, a strength data extractor 123 and finally a buffer 141. The vocal data extractor 122 extracts vocal data from which the strength data extractor 123 then extracts strength data and this is finally stored block by block in the buffer 141. A horizontal unit time extractor 142, a screen display indicator extractor 143, a clear screen data extractor 144 and a current lyric position indicator extractor (current lyric position indicator reading means) 130 are each connected in parallel to the decoder 121 for the purpose of extracting horizontal unit time, screen display indicators, clear screen data and current lyric position indicators respectively. The current lyric position indicator extractor 130 is in turn connected to a delay device 145 which delays the output signal by the time interval t. The output signals from each of the buffer 141, the horizontal unit time extractor 142, the screen display indicator extractor 143, the clear screen data extractor 144 and the delay device 145 are each input to the graph plotting device 146 where the first image signal is created in accordance with said output signals in order to indicate the appropriate vocal strength level. The first image signal is then input to the synthesis device 147 where it is combined with the second image signal from the character display device 175, which will be described in more detail below, and then input to the visual display medium 150. The output signal of the aforementioned screen display indicator extractor 143 is input in the form of a trigger signal to the aforementioned buffer 141.

Figure 4:
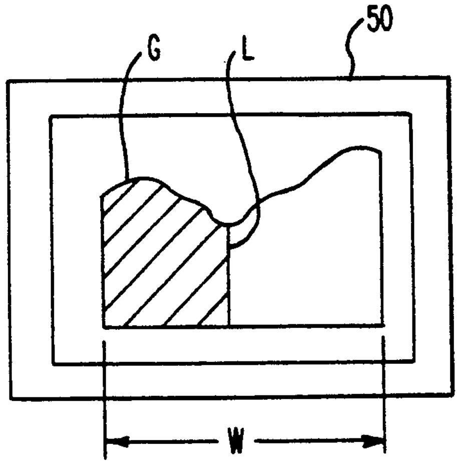

Next there follows a description of the operation of the visual display medium 150 on receipt of the first image signal. First, the horizontal size W of the image is determined on the basis of the horizontal unit time read by the horizontal unit time extractor 142. Next, the first image signal is set to high by the screen display indicator, which has been read by the screen display indicator extractor 143, and at the same time strength data is output from the buffer 141. As a result the strength data for one block is converted into the form of the wavy line graph G, as shown in FIG. 4, which is displayed on screen in advance of the corresponding music. The current position within the said block, as specified by the current lyric position indicator, which is read by the current lyric position indicator extractor 130, is marked in time with the music by the vertical line L. The areas to left and right of the vertical line L are displayed in different colors. In this case, since the screen display indicators are set at fixed time intervals t in advance of the boundary of each block, the screen update for a given block (bar) will be carried out at time interval t in advance of the end of the corresponding music. The current lyric position indicator, however, is delayed by the delay device 145 and output in time with the music itself. In other words, the user is able to watch the vertical line L, which marks the current position in the lyrics, moving across the screen from left to right on the background formed by the wavy line graph G, which represents the strength data of the current block. At the same time the user can also see the space behind the vertical line L change to a different color from that of the space ahead of said vertical line L. Then, when the next screen display indicator is read, the screen is cleared and the wavy line graph G of the strength data of the next block is displayed on screen and the current lyric position processing operation, which is carried out in accordance with the current lyric position indicators, is repeated as required. When the piece of music ends, the screen is cleared by the clear screen data.

There now follows a description of the display of lyrics by means of the visual display medium 150. A character code extractor 171, a buffer 172 and a character pattern generator 173 are each connected in sequence to the aforementioned decoder 121 such that the character codes relating to each block can be read by the character code extractor 171 and input to the buffer 172 block by block. The character codes are subsequently output from the buffer into the character pattern generator 173 where they are used as the basis for the creation of character patterns. In this case, the output signal of the screen display indicator extractor 143 constitutes a trigger signal to the buffer 172. 174 is a character color change device which is activated by output signals from the delay device 145. The output signals from both the character pattern generator 173 and the character color change device 174 are input to the character display device 175 where they form the basis for the creation of the second image signal which is used to indicate the characters required. The second image signal is then input by way of the synthesis device 147 to the visual display medium 150.

There now follows a description of the operation of the visual display medium 150 on receipt of the second image signal. First, when the screen display indicator is read by the screen display indicator extractor 143, then the data stored in the buffer 172 is also released and in this way the lyrics are displayed on screen. There is also a corresponding change in the color of the lyrics up as far as a point determined as the end of a fixed period of time t after the current lyric position indicator has been read by the current lyric position indicator extractor 130. In other words the color of the words changes up to and in line with the forward movement of the current lyric position as synchronized with the progress of the piece of music. Within the overall configuration outlined above, we may also identify a vocal data reading means 120 which comprises the decoder 121, the vocal data extractor 122 and the strength data extractor 123 and which, by referencing the memory means 110, reads vocal data from which it then extracts strength data. We may also identify an image control means 140 which comprises the buffer 141, the horizontal unit time extractor 142, the screen display indicator extractor 143, the clear screen data extractor 144, the delay device 145, the graph plotting device 146 and the synthesis device 147 and which, on receipt of output from the vocal data reading means 120 and the current lyric position indicator reading means 130, controls the visual display medium 150 in such a way that it displays the strength data extracted from the vocal data relating to a given block in advance of the corresponding music while at the same time displaying the lyric position within said block in time with the corresponding music.

In other words, with the help of the preferred embodiment outlined above, the user is able to observe the required strength of a particular vocal block in advance of the reproduction of the corresponding music and in this way to keep a check on the strength of vocal presentation that is required while he is singing.

Figure 5:
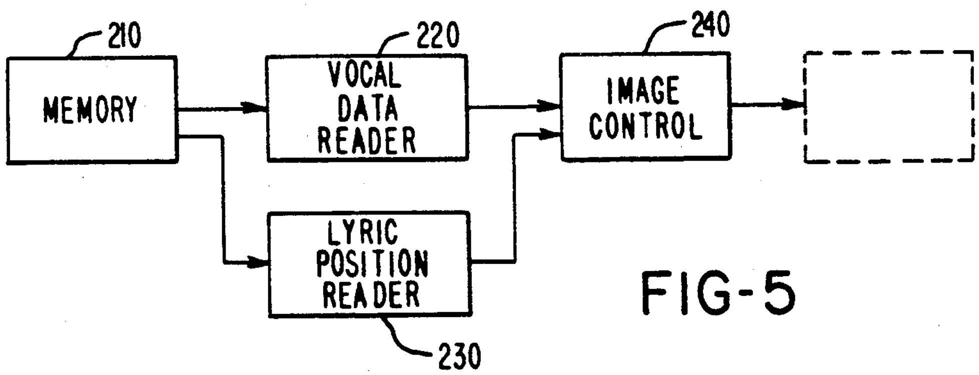
FIG. 5 is a block diagram illustrating the basic configuration of the second preferred embodiment of the invention.

There now follows a description of the second preferred embodiment. FIG. 5 illustrates the basic configuration of the second preferred embodiment. In the first preferred embodiment, the vocal data incorporated strength data. In the second preferred embodiment, on the other hand, the vocal data incorporates pitch data, which indicates the appropriate pitch of a piece of music, in place of strength data. In other words, the vocal data reading means 220 references the memory means 210 in order to read vocal data from which it then extracts pitch data. On receipt of output from the vocal data reading means 220 and the current lyric position indicator reading means 230, the image control means 240 controls the visual display medium in such a way that it displays the pitch data extracted from the vocal data relating to a given block in advance of the corresponding music while at the same time displaying the lyric position within said block in time with the corresponding music. A more detailed block diagram of this configuration would thus bear a very close resemblance to the configuration illustrated in FIG. 2 except that the strength data extractor 123 would be replaced by a pitch data extractor and the pitch data would be extracted from the vocal data by said pitch data extractor.

In other words, with the help of the second preferred embodiment, the user is able to observe the required pitch of a particular vocal block in advance of the reproduction of the corresponding music and in this way to keep a check on the pitch of the vocal presentation that is required while he is singing.

Figure 6:
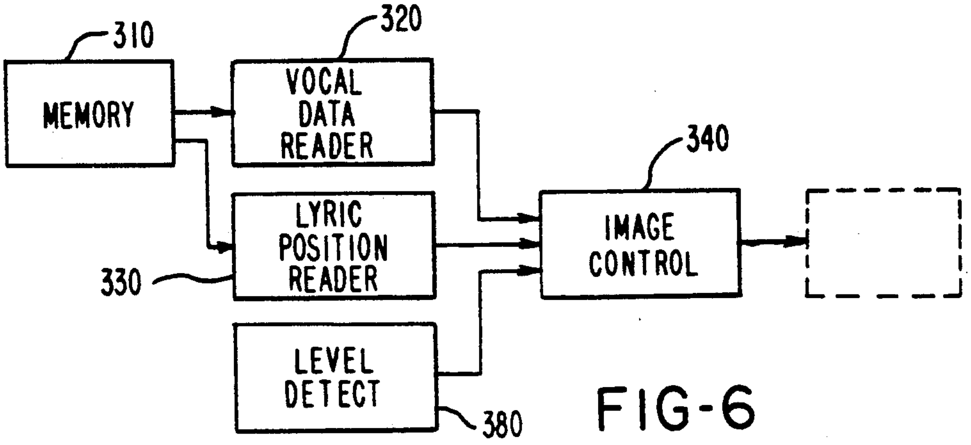
FIG. 6 to FIG. 8 illustrate the third preferred embodiment of the invention where
Figure 7:
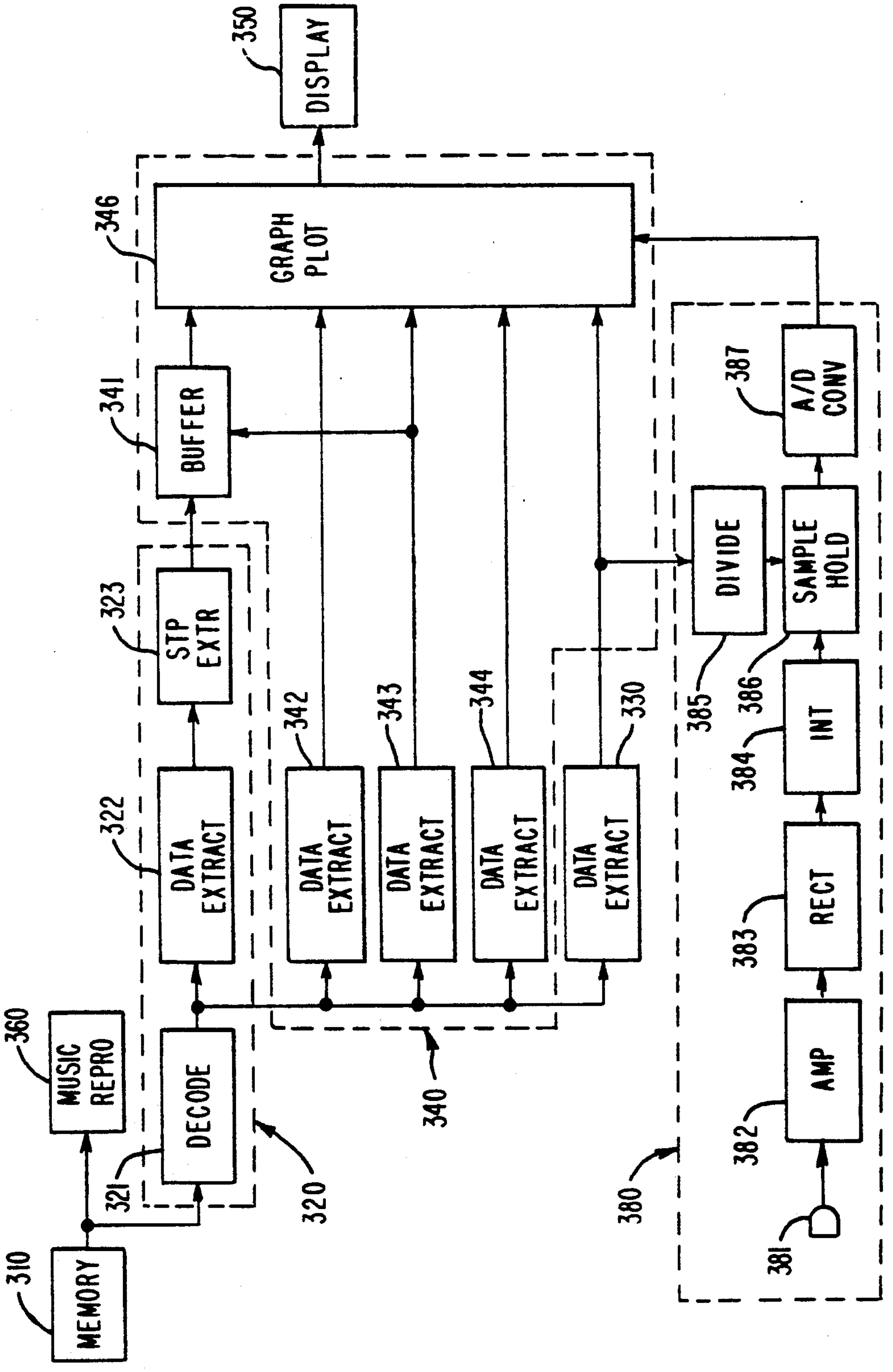
Figure 8:
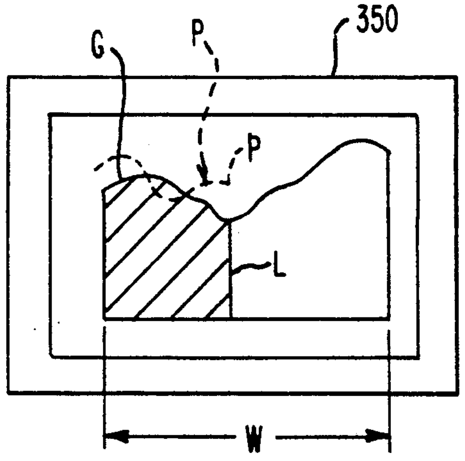

There now follows a description of the third preferred embodiment of the invention by reference to FIG. 6 to FIG. 8. The first and second preferred embodiments illustrated configurations for the display of vocal data. The third preferred embodiment, on the other hand, illustrates a configuration of the invention suitable for the comparison of vocal data and actual vocal presentation and for the display of the results of said comparison. FIG. 6 illustrates the basic configuration of the invention while FIG. 7 shows the same thing but in more detail. In FIG. 7 310 is a memory means of the same type as that incorporated into the first preferred embodiment and the vocal data also incorporates strength data.

Said memory means 310 is also connected to a reproduction device 360 such that music data can be read from the memory means 310 and subsequently reproduced on said reproduction device.

The memory means 310 is also connected to a decoder 321 which is connected in sequence to a vocal data extractor 322, a strength data extractor 323 and finally a buffer 341. The vocal data extractor 322 extracts vocal data from which the strength data extractor 323 then extracts strength data and this is finally stored block by block in the buffer 341.

A horizontal unit time extractor 342, a screen display indicator extractor 343, a clear screen data extractor 144 and a current lyric position indicator extractor (current lyric position indicator reading means) 330 are each connected in parallel to the decoder 321 for the purpose of extracting horizontal unit time, screen display indicators, clear screen data and current lyric position indicators respectively. The output signals from each of the buffer 341, the horizontal unit time extractor 342, the screen display indicator extractor 343, and the clear screen data extractor 344 are each input to the graph plotting device 346. The output signals of the graph plotting device are input to the visual display medium 350. At the same time, the output signal of the aforementioned screen display indicator extractor 343 is input in the form of a trigger signal to the aforementioned buffer 341.

There follows a description of the detection of vocal strength level from an actual vocal presentation. 381 in FIG. 7 is a known microphone which is used to collect the sound of the user's vocals and to which are connected in sequence a microphone amplifier 382, a full-wave rectifier 383, an integrator 384, a divider 385, a sample holder 386 and an AD converter 387. A voice signal received from the microphone 381 is first amplified by the microphone amplifier 382, then rectified by the full-wave rectifier 383 and integrated by the integrator 384. The resultant signal is then subjected to sampling and the sample value stored by the sample holder 386. At the same time, the timing of the sampling operation is determined by a signal output by the divider 385 on the basis of a division of the current lyric position indicator frequency. The signal output by the sample holder 386 is next subjected to AD conversion by the AD converter 387 and then input to the graph plotting device 345 as vocal strength level.

The graph plotting device 346 then creates an image signal, based both on the strength data extracted from the vocal data and also on the vocal strength level derived from the actual vocal presentation, and inputs it to the visual display medium 350 for comparison and display. First, the horizontal size W of the image is determined on the basis of the horizontal unit time read by the horizontal unit time extractor 342. Next, the image signal is set to high by the screen display signal which has been read by the screen display signal extractor 343, and at the same time strength data is output from the buffer 341. This results in the strength data for one block assuming the form of the solid line graph G as shown in FIG. 8 which is displayed on screen in advance of the corresponding music. The current position within the said block, as specified by the current lyric position indicator read by the current lyric position indicator extractor 330, is marked in time with the music by the vertical line L. The areas to left and right of the vertical line L are displayed in different colors. In other words, the user is able to watch the vertical line L, which marks the current position in the lyrics, moving across the screen from left to right on the background formed by the solid line graph G, which represents the strength data of the current block. At the same time the user is also able to watch the space behind the vertical line L change to a different color from that of the space ahead of said vertical line L.

In this sort of case, the vocal strength level p obtained by a sampling operation timed to coincide with the current lyric position indicators is displayed above the vertical line L as shown in FIG. 8. Each separate recording of the vocal strength level p is kept in the same position on screen until the whole of the block in question is cleared from the screen with the result that the indications of vocal strength level p up as far as the current lytic position are displayed on screen in the form of the broken line graph P, which thus enables the user to make an instant comparison with the strength data represented by the solid line graph G. In other words, the user is able to ascertain his own vocal strength level from the broken line graph P and to compare this with the strength data represented by the solid line graph G. The user is in this way able to gauge the perfection of his own vocal rendition in terms of its strength.

When the next screen display indicator is read, the current screen is cleared and the strength data contained in the next block is displayed on the screen in the shape of the solid line graph G. The processing operation outlined above is then repeated whereby the actual vocal strength level, which is obtained by sampling in time with the current lyric display indicators which have been used for the display of the current lyric position, is recorded on screen in the form of the broken line graph P. When the piece of music ends, the screen is cleared by the clear screen data.

The display of lyrics on screen is, of course, also based on the use of character data but a description of this particular processing operation has been omitted. Within the overall configuration outlined above, we may also identify a vocal data reading means 320 which comprises the decoder 321, the vocal data extractor 322 and the strength data extractor 323 and which, by referencing the memory means 310, reads vocal data from which it then extracts strength data. We may also identify a vocal strength level detection means 380 which detects the strength level of an actual vocal rendition and which comprises a microphone 381, a microphone amplifier 382, a full-wave rectifier 383, an integrator 384, a divider 385, a sample holder 386 and an AD converter 387.

We may further identify an image control means 340 which comprises the buffer 341, the horizontal unit time extractor 342, the screen display indicator extractor 343, the clear screen data extractor 344, and the graph plotting device 346 which, on receipt of output from the vocal data reading means 320, the current lyric position indicator reading means 330 and the vocal strength level detection means 380, controls the visual display medium 350 in such a way that it displays the strength data extracted from the vocal data relating to a given block in advance of the corresponding music while at the same time displaying the lyric position within said block in time with the corresponding music, and while also comparing the strength levels of actual vocal renditions with the strength data.

Figure 9:
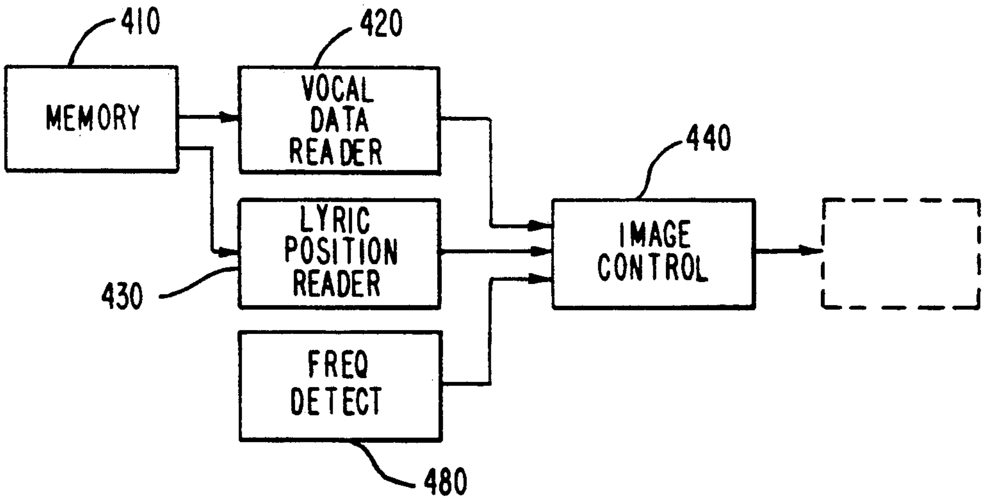
FIG. 9 to FIG. 11 illustrate the fourth preferred embodiment of the invention where
Figure 10:
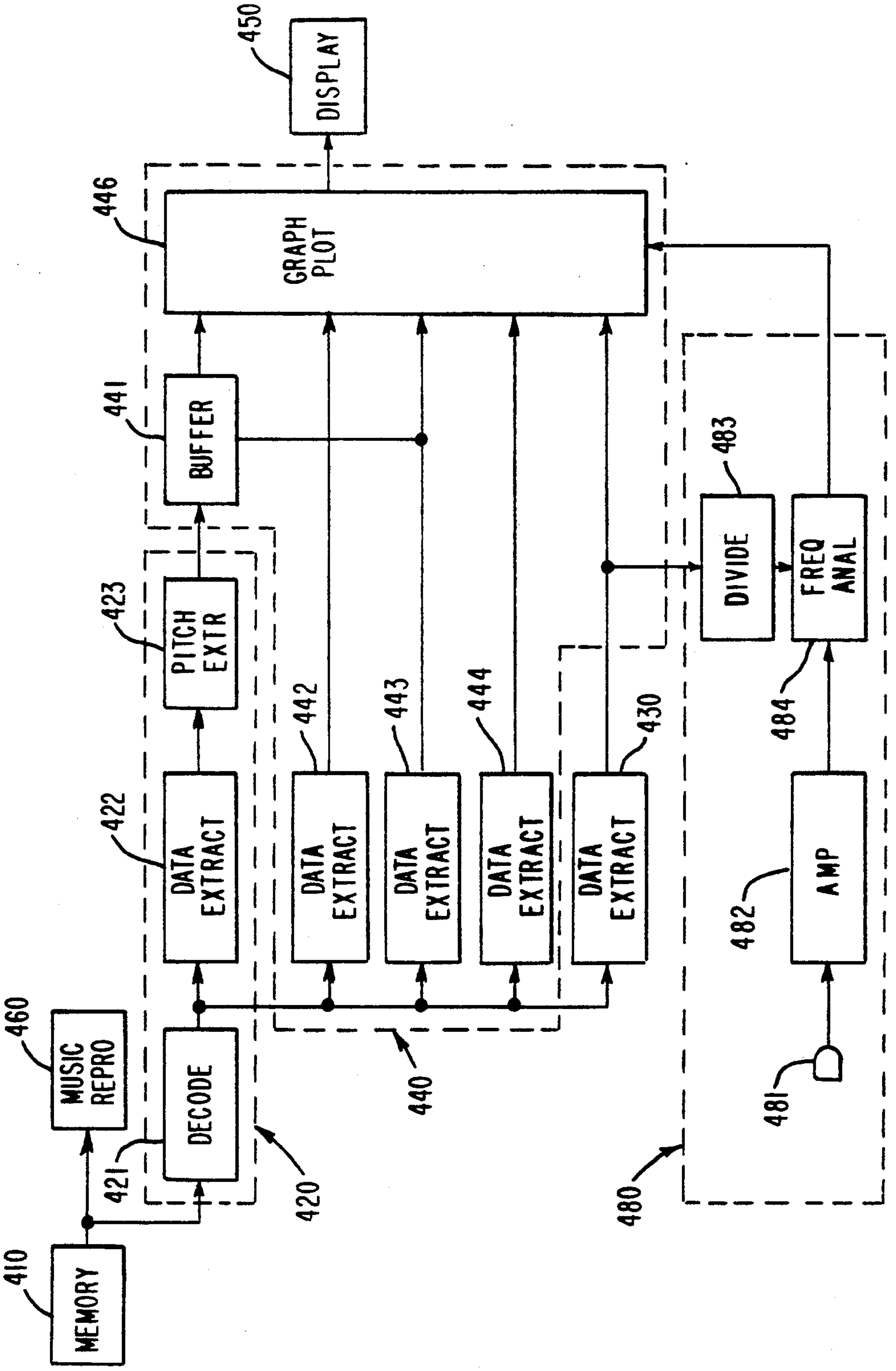
Figure 11:
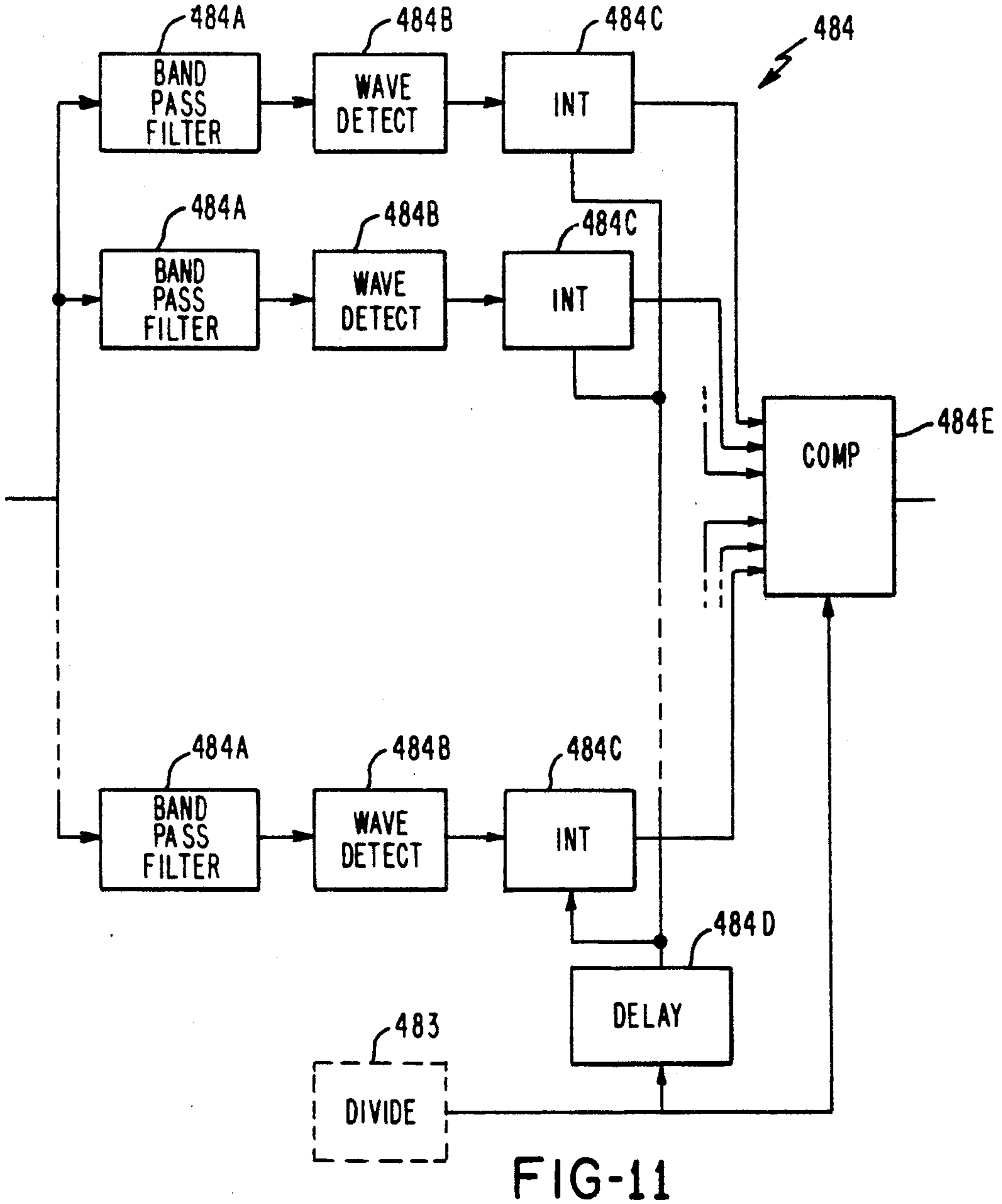

There now follows a description of the fourth preferred embodiment of the invention by reference to FIG. 9 to FIG. 11. In the third preferred embodiment, the vocal data incorporated strength data. In the fourth preferred embodiment, on the other hand, the strength data is replaced by pitch data. FIG. 9 illustrates the basic configuration of the invention while FIG. 10 shows the same thing but in more detail. In FIG. 10 410 is a memory means of the same type as that incorporated into the second preferred embodiment and the vocal data also incorporates pitch data.

Said memory means 410 is also connected to a reproduction device 460 such that music data can be read from the memory means 410 and subsequently reproduced on said reproduction device 460.

The memory means 410 is also connected to a decoder 421 which is connected in sequence to a vocal data extractor 422, a pitch data extractor 423 and finally a buffer 441. The vocal data extractor 422 extracts vocal data from which the pitch data extractor 423 then extracts pitch data and this is finally stored block by block in the buffer 441. A horizontal unit time extractor 442, a screen display indicator extractor 443, a clear screen data extractor 444 and a current lyric position indicator extractor (current lyric position indicator reading means) 430 are each connected in parallel to the decoder 421 for the purpose of extracting horizontal unit time, screen display indicators, clear screen data and current lyric position indicators respectively. The output signals from each of the buffer 441, the horizontal unit time extractor 442, the screen display indicator extractor 443, the clear screen data extractor 444 and the current lyric position indicator extractor 430 are input to the graph plotting device 446. The output signals of the graph plotting device 446 are input to the visual display medium 450. At the same time, the output signal of the aforementioned screen display indicator extractor 443 is input in the form of a trigger signal to the aforementioned buffer 341.

There follows a description of the identification of the basic frequency from an actual vocal presentation. 481 in FIG. 10 is a microphone which is used to collect the sound of the user's vocals and to which are connected in sequence a microphone amplifier 482 and a frequency analyzer 484. A voice signal received from the microphone 481 is first amplified by the microphone amplifier 482 and the basic frequency is then identified by the frequency analyzer 484. At the same time, the current lytic position indicator frequency is divided by the divider 483 and the resultant signal input to the frequency analyzer 484. The signal output by the frequency analyzer 484 is then input to the graph plotting device 446.

There now follows a description of the configuration of the above mentioned frequency analyzer 484 by reference to FIG. 11. The frequency analyzer 484 comprises a number of matched filters. **484*a* in FIG. 11 represents a number N of band pass filters numbered from 1 to N respectively and connected in parallel with the microphone amplifier 482. Each of the frequency bands obtained by dividing the vocal sound band into N number of smaller bands is allocated as a pass band to one of said filters. A wave detector 484*b* and an integrator 484*c* are connected in sequence to each band pass filter 484*a*. The wave detector 484*b* detects the signals passing each of the band pass filters 484*a* and eliminates the high frequency component, after which the signal is integrated by the integrator 484*c*. The output of each of the integrators 484*c* is then input to the comparator detector circuit 484*e*. At the same time, the output of the aforementioned divider 483 is input both to said integrators 484*c*, after being subjected to delay processing by the delay circuit 484*d*, and also, without further processing, to the comparator detector circuit 484*e*. In other words, the comparator detector circuit 484*e* first compares the values output by each of the integrators 484*c* and then, having identified the highest value exhibited by any of the band pass filters 484*a*, it outputs the number (1 to N) which corresponds to that band. From this number it is possible to identify the band that has passed that particular band pass filter 484*a* as the basic vocal frequency. The operation of the comparator detector circuit 484*e* is synchronized with the current lyric position indicators by means of signals from the divider 483. Each of the integrators 484*c* are also subsequently cleared at a time determined in accordance with the delay of the delay circuit 484*d***.

The graph plotting device 446 then creates an image signal, based on the pitch data extracted from the vocal data and on the basic frequency derived from the actual vocal presentation, which it inputs to the visual display medium 450 for comparison and display. First, the horizontal size W of the image is determined on the basis of the horizontal unit time read by the horizontal unit time extractor 442. Next, the image signal is set to high by the screen display signal read by the screen display signal extractor 443 while at the same time pitch data is output from the buffer 441. This results in the pitch data for one block assuming the form of the solid line graph G which is displayed on screen in advance of the corresponding music. The current position within said block, as specified by the current lyric position indicator read by the current lyric position indicator extractor 430, is marked in time with the music by the vertical line L. The areas to left and right of the vertical line L are displayed in different colors. In other words, the user is able to watch the vertical line L, which marks the current position in the lyrics, moving across the screen from left to right on the background formed by the solid line graph G, which represents the pitch data of the current block. At the same time the user is also able to watch the space behind the vertical line L change to a different color from that of the space ahead of said vertical line L.

In this sort of case, the basic frequency p obtained by sampling in time with the current lyric position indicators is displayed above the vertical line L. This basic frequency p is held in the same position until the block in question is cleared from the screen with the result that the indications of basic frequency p up as far as the current lyric position are displayed on screen in the form of the broken line graph P which thus enables the user to make an instant comparison with the pitch data represented by the solid line graph G. In other words, the user is able to ascertain his own basic frequency from the broken line graph P and to compare this with the pitch data represented by the solid line graph G. The user is in this way able to gauge the perfection of his own vocal rendition in terms of its pitch.

When the next screen display indicator is read, the current screen is cleared and the pitch data contained in the next block is displayed on the screen in the shape of the solid line graph G. The processing operation is then repeated whereby the basic frequency, which has been obtained by sampling in time with the current lyric display indicators which have been used for the display of the current lyric position, is represented on screen in the form of the broken line graph P. When the piece of music ends, the screen is cleared by the clear screen data.

Within the overall configuration outlined above, we may also identify a vocal data reading means 420 which comprises the decoder 421, the vocal data extractor 422 and the pitch data extractor 423 and which, by referencing the memory means 410, reads vocal data from which it then extracts pitch data. We may also identify a frequency detection means 480 which identifies the basic frequency of an actual vocal rendition and which comprises a microphone 481, a microphone amplifier 482, a frequency analyzer 484 and a divider 483. We may further identify an image control means 440 which comprises the buffer 441, the horizontal unit time extractor 442, the screen display indicator extractor 443, the clear screen data extractor 444, and the graph plotting device 446 which, on receipt of output from the vocal data reading means 420, the current lyric position indicator reading means 430 and the frequency detection means 480, controls the visual display medium 450 in such a way that it displays the pitch data extracted from the vocal data relating to a given block in advance of the corresponding music while at the same time displaying the lyric position within said block in time with the corresponding music and while also comparing the basic frequencies of actual vocal renditions with pitch data.

Figure 12:
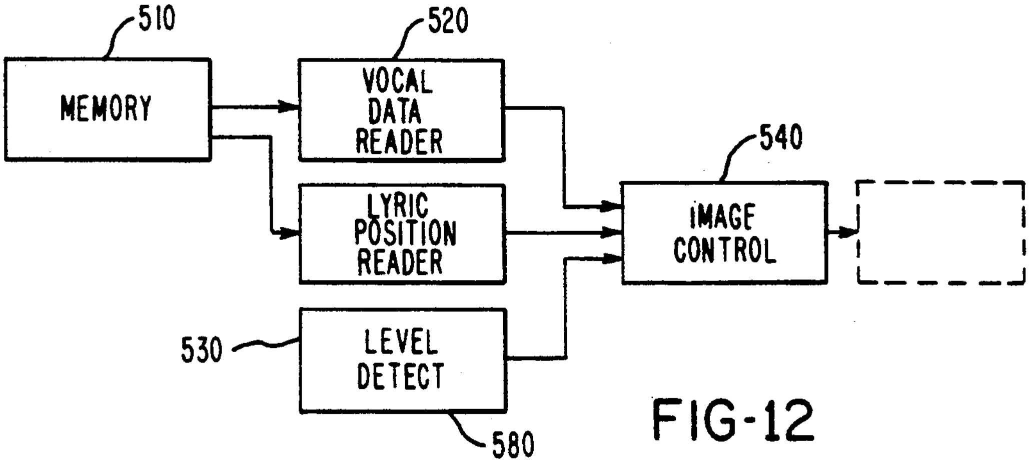
FIG. 12 and FIG. 13 illustrate the fifth preferred embodiment of the invention where
Figure 13:
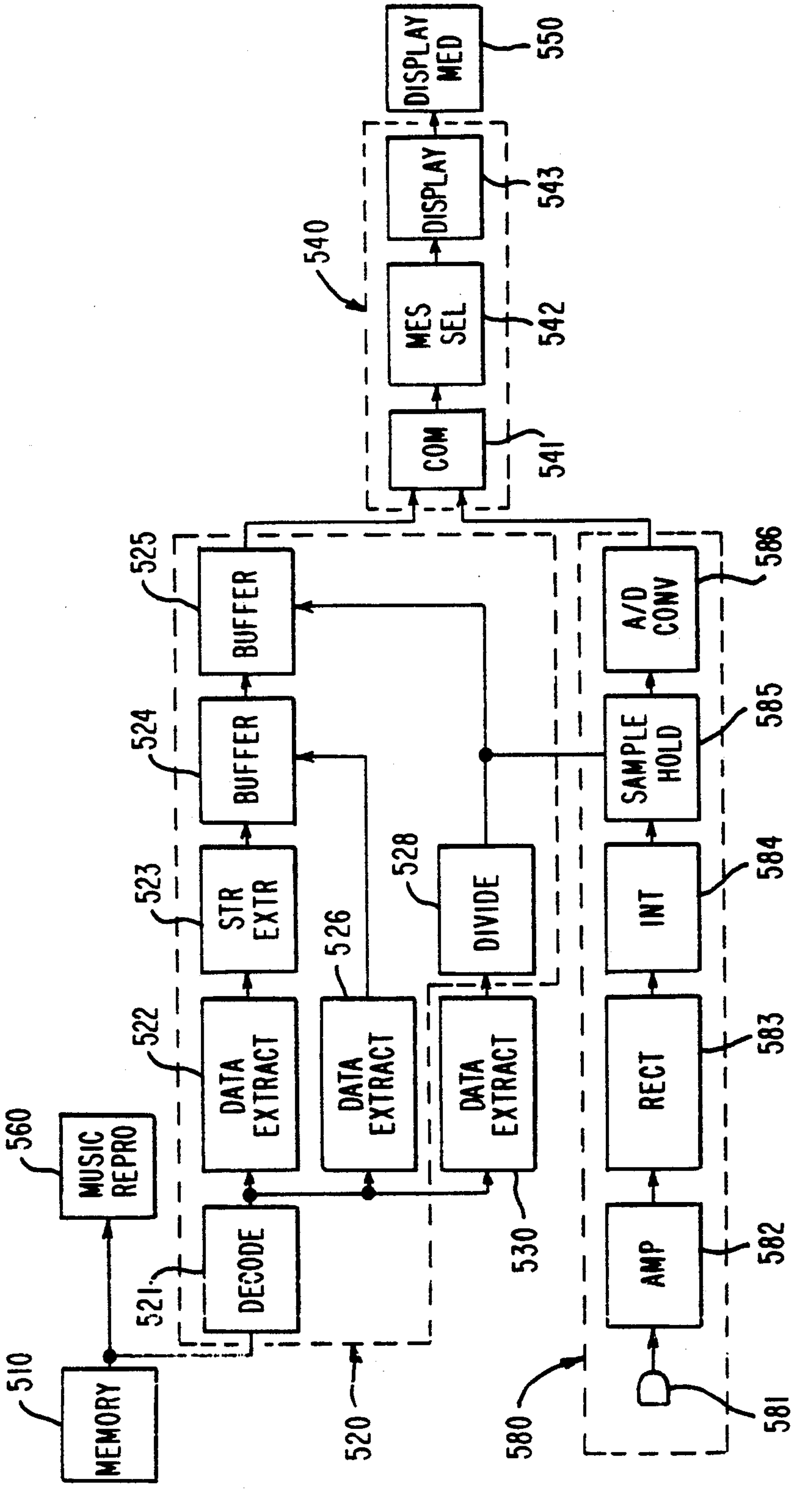

There now follows a description of the fifth preferred embodiment of the invention by reference to FIG. 12 and FIG. 13. FIG. 12 illustrates the basic configuration of the invention while FIG. 13 shows the same thing but in more detail. In FIG. 13 510 is a memory means of the same type as that incorporated into the first preferred embodiment and the vocal data also incorporates strength data. Said memory means 510 is also connected to a reproduction means 560 such that music data can be read from the memory means 510 and subsequently reproduced on said reproduction device.

The memory means 510 is also connected to a decoder 521 which is connected in sequence to a vocal data extractor 522, a strength data extractor 523 and to the first and second data buffers 524, 525. The vocal data extractor 522 extracts vocal data from which the strength data extractor 523 then extracts strength data and this is finally stored in the first and second data buffers 524, 525. A screen display indicator extractor 526 and a current lyric position indicator extractor (current lyric position indicator reading means) 530 are each connected in parallel to the decoder 521 for the purpose of extracting screen display indicators and current lyric position indicators respectively. A divider 528, which divides the frequency of the current lyric position indicators, is also connected to the current lyric position indicator extractor 530. The output signal from the second data buffer 525 is input to the comparator 541. The output signal of the screen display indicator extractor 526 is input in the form of a trigger signal to the first data buffer 524, while the output signal of the divider 528 is input in the form of a trigger signal to the second data buffer 525. The strength data read by the strength data extractor 523 into the first data buffer 524 is output from said first data buffer 524 to the second data buffer 525 each time a screen display indicator is received. At the same time the content of the second data buffer 525 is also output each time a current lyric position indicator is received.

There follows a description of the detection of vocal strength level from an actual vocal presentation. 581 in FIG. 13 is a microphone which is used to collect the sound of the user's vocals and to which are connected in sequence a microphone amplifier 582, a full-wave rectifier 583, an integrator 584, a sample holder 585 and an AD converter 586.

A voice signal received from the microphone 581 is first amplified by the microphone amplifier 582, then rectified by the full-wave rectifier 583 and integrated by the integrator 584. The resultant signal is then subjected to a sampling operation and the resultant sample value stored by the sample holder 585. At the same time, the timing of the sampling operation is determined by a signal output by the divider 588, or in other words a signal representing the current lyric position indicator frequency after it has been subjected to the dividing operation. The signal output by the sample holder 585 is next subjected to AD conversion by the AD converter 586 and then input to the above mentioned comparator 541 as the actual vocal strength level. In said comparator 541, the strength data and the vocal strength level at the current lyric position are synchronized in accordance with the current lyric position indicator as described above and then compared. It is then determined whether or not the vocal strength level is either at an "excess level", in which case the vocal strength level lies at a level in excess of that prescribed by the strength data, or is at the "correct level", in which case the vocal strength level lies within the tolerance limits prescribed by the strength data or is at a "shortfall level", in which case the vocal strength level lies at a level short of that prescribed by the strength data. A message selector 542, a display device 543 and a visual display medium 550 are connected in sequence to the comparator 541. The message selector 542 selects an appropriate message in accordance with whether the vocal strength is found to be at an "excess level", the "correct level" or a "shortfall level" and the display device 543 then outputs an appropriate display signal in accordance with the message received. On receipt of the display signal, the visual display medium 550 displays the appropriate message on screen. The message which corresponds to an "excess level" is "sing more quietly", the message which corresponds to a "correct level" is "as you are" and the message which corresponds to a "shortfall level" is "sing more loudly".

Within the overall configuration outlined above, we may also identify a vocal data reading means 520 which comprises the decoder 521, the vocal data extractor 522, the strength data extractor 523, the first data buffer 524, the second data buffer 525, the screen display indicator extractor 526, and the divider 528 and which, by referencing the memory means 510, reads vocal data from which it then extracts strength data. We may also identify a vocal strength level detection means 580 which detects the strength level of an actual vocal rendition and which comprises a microphone 581, a microphone amplifier 582, a full-wave rectifier 583, an integrator 584, a sample holder 585 and an AD converter 586. We may further identify an image control means 540 which comprises the comparator 541, the message selector 542, and the display device 543 which, on receipt of output from the vocal data reading means 520, the current lyric position indicator reading means 530 and the vocal strength level detection means 580, displays the strength data extracted from the vocal data relating to a given block in advance of the corresponding music while at the same time displaying the lyric position within said block in time with the corresponding music while also comparing the strength levels of actual vocal renditions with strength data and displaying an appropriate instruction on screen in accordance with the results of said comparison.

In the above preferred embodiment, therefore, the actual vocal strength level is compared with the strength data and, in cases where the results of the comparison indicate an "excess level", the message "sing more quietly" is displayed on screen, in cases where the results of the comparison indicate a "correct level", the message "as you are" is displayed on screen and, in cases where the results of the comparison indicate a "shortfall level", the message "sing more loudly" is displayed on screen. The user is in this way able to both accurately and easily gauge the perfection of his own vocal rendition in terms of its strength.

Figure 14:
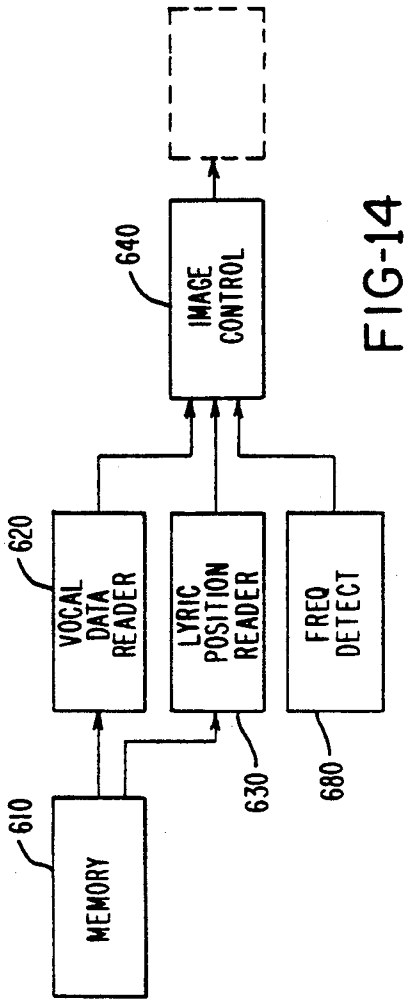
FIG. 14 and FIG. 15 illustrate the sixth preferred embodiment of the invention where
Figure 15:
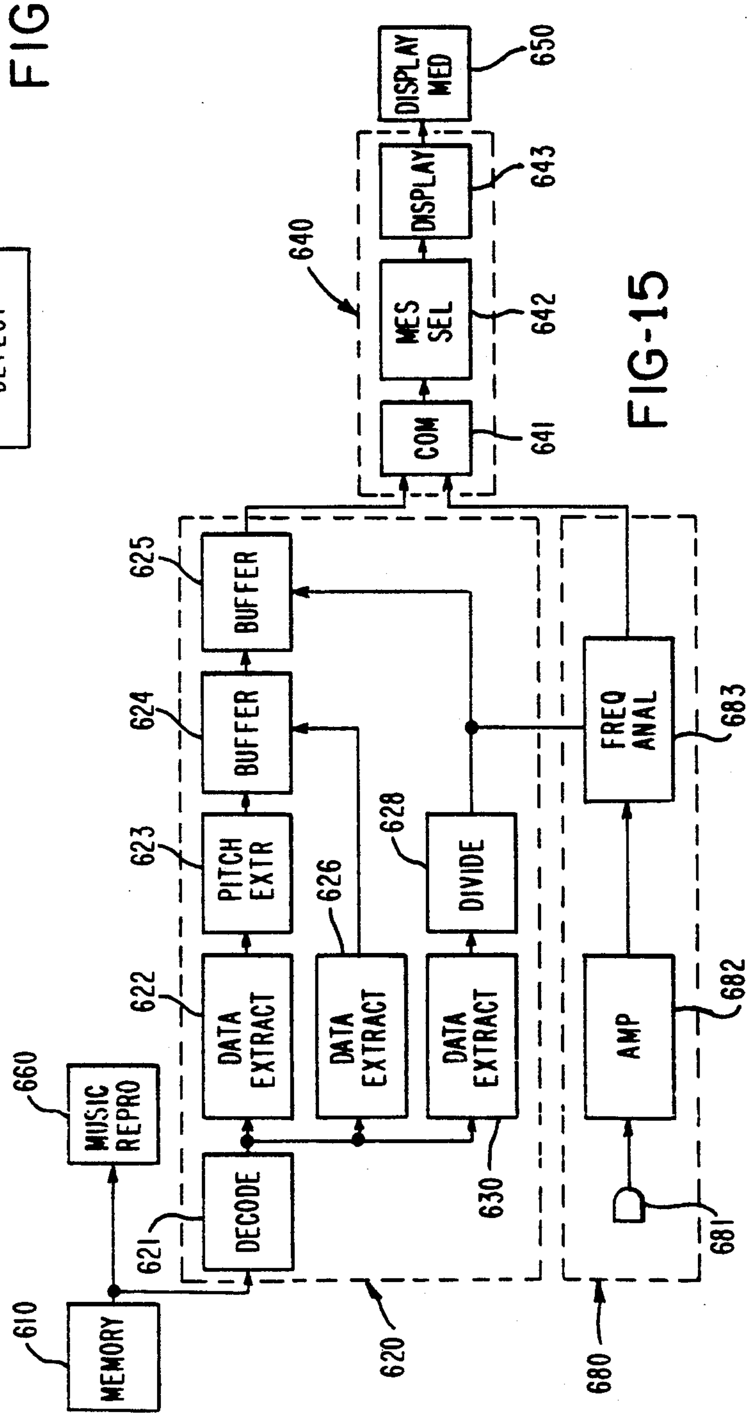

There now follows a description of the sixth preferred embodiment of the invention by reference to FIG. 14 and FIG. 15. FIG. 14 illustrates the basic configuration of the invention while FIG. 15 shows the same thing but in more detail. In FIG. 15 610 is a memory means of the same type as that incorporated into the second preferred embodiment and the vocal data also incorporates pitch data.

Said memory means 610 is also connected to a reproduction device 660 such that music data can be read from the memory means 610 and subsequently reproduced on said reproduction device 660.

The memory means 610 is also connected to a decoder 621 which is connected in sequence to a vocal data extractor 622, a pitch data extractor 623 and to the first and second data buffers 624, 625. The vocal data extractor 622 extracts vocal data from which the pitch data extractor 623 then extracts pitch data which is finally stored in the first and second data buffers 624, 625. A screen display indicator extractor 626 and a current lyric position indicator extractor (current lyric position indicator reading means) 630 are each connected in parallel to the decoder 621 for the purpose of extracting screen display indicators and current lyric position indicators respectively. A divider 628, which divides the frequency of the current lyric position indicators, is also connected to the current lyric position indicator extractor 630. The output signal from the second data buffer 625 is input to the comparator 641. The output signal of the screen display indicator extractor 626 is input in the form of a trigger signal to the first data buffer 624, while the output signal of the divider 628 is input in the form of a trigger signal to the second data buffer 625. The pitch data read by the pitch data extractor 623 into the first data buffer 624 is output from said first data buffer 624 to the second data buffer 625 each time a screen display indicator is received. At the same time the content of the second data buffer 625 is also output each time a current lyric position indicator is received.

There follows a description of the identification of the basic frequency of an actual vocal presentation. 681 in FIG. 15 is a microphone which is used to collect the sound of the user's vocals and to which are connected in sequence a microphone amplifier 682 and a frequency analyzer 683. A voice signal received from the microphone 681 is first amplified by the microphone amplifier 682 and then input to the frequency analyzer 683 where the basic frequency is identified. At the same time, the signal representing the frequency of the current lyric position indicator following division by the divider 628 is also input to the frequency analyzer 683. The signal output by said frequency analyzer 683 is then input to the aforementioned comparator 641 as the basic frequency.

The frequency analyzer 683 referred to above is identical to the one detailed during the description of the fourth preferred embodiment above.

In said comparator 641, the pitch data and the basic frequency at the current lyric position are synchronized in accordance with the current lyric position indicator as described above and then compared. It is then determined whether or not the basic frequency is either "over pitched", in which case the basic frequency stands at a higher pitch than that prescribed by the pitch data, or is at the "correct pitch", in which case the basic frequency lies within the tolerance limits prescribed by the pitch data or is "under pitched", in which case the basic frequency stands at a lower pitch than that prescribed by the pitch data. A message selector 642, a display device 643 and a visual display medium 650 are connected in sequence to the comparator 641. The message selector 642 selects an appropriate message in accordance with whether the basic frequency is found to be either "over pitched", at the "correct pitch" or "under pitched" and the display device 643 then outputs an appropriate display signal in accordance with the message received. On receipt of the display signal, the visual display medium 650 displays the appropriate message on screen. The message which corresponds to "over pitched" is "lower your pitch", the message which corresponds to a "correct pitch" is "as you are" and the message which corresponds to "under pitched" is "raise your pitch".

Within the overall configuration outlined above, we may also identify a vocal data reading means 620 which comprises the decoder 621, the vocal data extractor 622, the pitch data extractor 623, the first data buffer 624, the second data buffer 625, the screen display indicator extractor 626, and the divider 628 and which, by referencing the memory means 610, reads vocal data from which it then extracts pitch data. We may also identify a frequency detection means 680 which identifies the basic frequency of an actual vocal rendition and which comprises a microphone 681, a microphone amplifier 682 and a frequency analyzer 683. We may further identify an image control means 640 which comprises the comparator 641, the message selector 642, and the display device 643 which, on receipt of output from the vocal data reading means 620, the current lyric position indicator reading means 630 and the frequency detection means 680, displays the pitch data extracted from the vocal data relating to a given block in advance of the corresponding music while at the same time displaying the lyric position within said block in time with the corresponding music while also comparing the basic frequencies of actual vocal renditions with frequency data and displaying an appropriate instruction on screen in accordance with the results of said comparison.

In the above preferred embodiment, therefore, the basic frequency is compared with the pitch data and, in cases where the results of the comparison indicate that the vocal rendition is "over pitched", the message "lower your pitch" is displayed on screen, in cases where the results of the comparison indicate that the vocal rendition is at the "correct pitch", the message "as you are" is displayed on screen and, in cases where the results of the comparison indicate that the vocal rendition is "under pitched", the message "raise your pitch" is displayed on screen. The user is in this way able to both accurately and easily gauge the perfection of his own vocal rendition in terms of its pitch.

Although the comparators detailed during the descriptions of the fifth and the sixth preferred embodiments above are both used identify three separate categories, the number of categories can, in fact, be either smaller or greater than three. Furthermore, the contents of the messages need not be confined to the contents detailed above.

The messages detailed may be visual messages output on a visual display medium as described in the fifth and the sixth preferred embodiments above. They may equally, however by auditory messages output through a speaker, for example, or else a combination of the two.

Although in the fifth and sixth preferred embodiments above, strength data and pitch data are, in fact, displayed on the visual display medium, a description of the related processing operations has been omitted.

Moreover, in all of the preferred embodiments described above, the lyrics are displayed on the visual display medium in accordance with relevant character data but a description of the related processing operations has been omitted in this case too. The data referred to during the descriptions of each of the above preferred embodiments may, for example, be configured in the form of MIDI data. In this sort of case, an individual channel should be allocated to each of the music data and the vocal data respectively. The reproduction devices would in this case also have to be a MIDI sound source and a MIDI decoder. Although, in the preferred embodiments described above, the bar has been selected for use as the basic unit for the establishment of blocks, other basic units would be equally acceptable.

What is claimed is:

1. A vocal display device for providing displays on a visual display medium of vocal data representing characteristics of vocals and a current lyric position indicator representing a current position in lyrics associated with music data representing music, the vocal display device comprising:

(a) memory means for storing the music data and the vocal data and the current lyric position indicator associated with the music data;

(b) vocal data reading means connected to the memory means for reading the vocal data;

(c) lyric position indicator reading means connected to the memory means for reading the current lyric position indicator;

(d) detection means for detecting characteristics of actual vocals; and (e) image control means responsive to the vocal data reading means, the lyric position indicator reading means and the detection means and connected to the visual display medium for generating in real time displays of selected messages as a function of a comparison of the characteristics of vocals to the characteristics of actual vocals at the current position in the lyrics.

2. The vocal display device according to claim 1 wherein the image control means further comprises:

(a) a comparator responsive to the vocal data and connected to the detection means for determining whether the characteristics of actual vocals exceeds, is short of or is within predetermined tolerance limits prescribed by the characteristic of vocals; and (b) a message selector responsive to output from the comparator for selecting a message corresponding to whether the characteristics of actual vocals exceeds, is short of or is within predetermined tolerance limits prescribed by the characteristics of vocals.

3. The vocal display device according to claim 2 wherein the vocal data reading means further comprises:

(a) decoder means connected to the memory for decoding data from the memory;

(b) vocal data extractor means for extracting the characteristics of vocals;

(c) a screen display data extractor means for extracting screen display indicators;

(d) a first buffer connected to the vocal data extractor and responsive to a first trigger signal represented by the screen display indicators;

(e) a second buffer connected to the first buffer for receiving the vocal data in response to the first trigger signal triggering the first buffer; and (e) a divider connected to the lyric position indicator reading means for providing a second trigger signal to the second buffer and the detection means.

4. The vocal display device according to claim 1 wherein the vocal data includes strength data representing the required strength of a vocal delivery, and the vocal data reading means further comprises a strength level extractor for extracting strength data.

5. The vocal display device of claim 4 wherein the detection means further comprises strength level detection means for detecting a strength level of actual vocals.

6. The vocal display device of claim 5 wherein the image control means further comprises:

(a) a comparator responsive to the strength data and connected to the strength level detection means for determining whether the strength level of actual vocals exceeds, is short of or is within predetermined tolerance limits prescribed by the strength data; and (b) a message selector responsive to output from the comparator for selecting a message corresponding to whether the strength level of the actual vocals exceeds, is short of or is within predetermined tolerance limits prescribed by the required strength of a vocal delivery.

7. The vocal display device according to claim 1 wherein the vocal data includes pitch data representing a required pitch of a vocal delivery, and the vocal data reading means further comprises a pitch data extractor for extracting pitch data.

8. The vocal display device of claim 7 wherein the detection means further comprises basic frequency detection means for detecting basic frequencies of actual vocals.

9. The vocal display device of claim 8 wherein the image control means further comprises:

(a) a comparator responsive to the pitch data and connected to the basic frequency detection means for determining whether the basic frequencies of actual vocals exceeds, is short of or is within predetermined tolerance limits prescribed by the pitch data; and (b) a message selector responsive to output from the comparator for selecting a message corresponding to whether the basic frequencies of actual vocals exceeds, is short of or is within predetermined tolerance limits prescribed by the required pitch of a vocal delivery.

* * * * *